United States Patent [19]

Inui et al.

[11] 4,154,785

[45] May 15, 1979

[54] METHOD OF MANUFACTURING A TOUGH BOARD OF THERMOPLASTIC RESIN FOAM HAVING INTEGRAL SKINS AND A DENSE INTERMEDIATE LAYER

[75] Inventors: Mitsuo Inui, Yokohama; Geoge Murota, Tokyo; Akira Kasai, Fujisawa; Naonori Shiina, Tokyo; Yoshikazu Kashiwa, Yokohama, all of Japan

[73] Assignee: The Furukawa Electric Co., Ltd., Tokyo, Japan

[21] Appl. No.: 900,766

[22] Filed: Apr. 27, 1978

Related U.S. Application Data

[63] Continuation-in-part of Ser. No. 622,610, Oct. 15, 1975, abandoned.

[30] Foreign Application Priority Data

Oct. 22, 1974 [JP] Japan ................................ 49-121600
Nov. 20, 1974 [JP] Japan ......................... 49-140268[U]

[51] Int. Cl.² .............................................. B29D 27/00
[52] U.S. Cl. .................................. 264/45.5; 264/46.1; 264/53; 264/171; 264/DIG. 5; 264/DIG. 14; 425/325; 425/817 C; 428/213; 428/315; 428/322; 521/51

[58] Field of Search ................ 264/45.9, 45.5, 46.2, 264/46.3, 53, DIG. 14, 46.1, 171, DIG. 5; 425/325, 817 C; 428/213, 322, 320, 315; 521/51

[56] References Cited

U.S. PATENT DOCUMENTS

| 3,431,163 | 3/1969 | Gilbert | 264/53 X |
| 3,431,164 | 3/1969 | Gilbert | 264/53 X |
| 3,444,036 | 5/1969 | Russell et al. | 264/46.3 X |
| 3,523,988 | 8/1970 | Roehr et al. | 264/41 |
| 3,863,000 | 1/1975 | Kasai et al. | 264/45.5 |
| 4,017,245 | 4/1977 | Lang | 264/46.1 X |

*Primary Examiner*—Philip Anderson
*Attorney, Agent, or Firm*—Carroll F. Palmer

[57] ABSTRACT

A tough board of thermoplastic resin foam provided with skin layers on both surfaces thereof and formed of large cells elongated in the direction of the thickness of said board, wherein an intermediate high density layer thicker than 0.1mm lies substantially halfway between the upper and lower surfaces of said board. The board is formed by extruding thermoplastic resin containing dissolved foaming agent as a sheet, cooling the upper and lower surfaces rapidly to form solid skin layers and then slowly cooling while allowing controlled expansion thereof between expansion restricting members.

10 Claims, 3 Drawing Figures

METHOD OF MANUFACTURING A TOUGH BOARD OF THERMOPLASTIC RESIN FOAM HAVING INTEGRAL SKINS AND A DENSE INTERMEDIATE LAYER

CROSS REFERENCE TO RELATED APPLICATION

This application is a continuation-in-part of copending application Ser. No. 622,610, filed Oct. 15, 1975 now abandoned.

BACKGROUND OF THE INVENTION

1. Field of the Invention

This invention relates to a tough board of thermoplastic resin foam having a prominent mechanical, particularly compressive and bending strength and to a method of manufacturing the same.

2. Description of the Prior Art

In recent years, plastics foamed articles are utilized in large quantities over a wide field due to excellent properties of heat insulation, shock absorption and buoyancy. However, one of the drawbacks of such plastics foamed articles is low mechanical strength. Therefore, demand has been made for the development of plastics foamed articles characterized by high mechanical strength.

Some foam manufactured from thermoplastic resin by conventional methods is a soft mass generally formed of fine cells having a density of about 0.03 g/cm$^3$, and presents prominent heat-insulating and shock-absorbing properties, but has extremely small mechanical strength.

By way of contrast, U.S. Pat. No. 3,523,988 discloses a method of manufacturing a foam of great mechanical strength in order to attain improvements in the aforesaid drawbacks accompanying foams of the prior art. According to such patented method the die includes an expansion chamber to reduce pressure therein. In a die slit next to said expansion chamber, there is formed a mixture of polyolefin, volatile foaming agent and nucleating agent. Compression is applied to collapse the cells on the surfaces of the foam so as to produce a hard skin. The foam is fully expanded in said expansion chamber under a certain pressure. Such method differs from this present invention in that the foam is expanded while it is subjected to a shearing stress in a confined zone. Accordingly, the foam obtained by the U.S. patent method consists of cells less than 5 mm in diameter and has a density of 0.16 g/cm$^3$ at the lowest, and a thickness of less than 10 mm.

The present inventors previously provided a method of manufacturing plastics foamed articles having prominent mechanical strength by means of an extrusion process. As disclosed in U.S. Pat. No. 3,863,000, a mixture of plastics material and foaming agent is extruded through an extruder in the form of a board. The upper and lower surfaces of the board are quenched prior to foaming to form skin layers thereon. Thereafter, due to the solid skin layers thereon, the board is allowed to foam and expand only in the direction of the thickness so as to be formed of cells elongated in said direction, thereby providing high mechanical strength. With this patented process, however, the cells of the foamed board tend to be too much elongated in the direction of the thickness thereof. Therefore, provided with a hard skin on the upper and lower surfaces, a foamed board, if made thick, is likely to decrease in compressive strength.

SUMMARY OF THE INVENTION

The present inventors have conducted earnest studies to eliminate the above-mentioned drawbacks, and found a tough foamed board provided with skin layers on the upper and lower surfaces which is improved in mechanical properties and thermal workability and a method of manufacturing the same. The tough foamed board of this invention provided with skin layers and formed of large cells elongated in the direction of the thickness of the board has an intermediate high density layer thicker than 0.1 mm lying substantially halfway between the upper and lower surfaces. Said foamed board is manufactured by extruding into the atmosphere plastics material having foaming agent dissolved therein in the form of a sheet or board, cooling the upper and lower surfaces of thereof rapidly to form skins thereon, prior to the substantial beginning of cell growth therein, allowing cells to be grown in the direction of the thickness of the board while restricting the extent of expansion in a controlled manner, thereby providing an intermediate high density layer lying substantially halfway between the upper and lower surfaces of the foamed board. Thus, two rows of cells elongated in the direction of the thickness of the foamed board, and shaped, for example, like footballs, are respectively arranged above and below said intermediate high density layer. According to this invention, foaming ratio, that is, the final thickness of a foamed board is restricted to 95 to 50% or preferably 90 to 70% of an average thickness which would be realized by the extruded board when foamed freely under atmospheric pressure.

BRIEF DESCRIPTION OF THE DRAWINGS

This invention can be more fully understood from the following detailed description when taken in conjunction with the accompanying drawing, in which.

DESCRIPTION OF THE PREFERRED EMBODIMENTS

Figure 3:
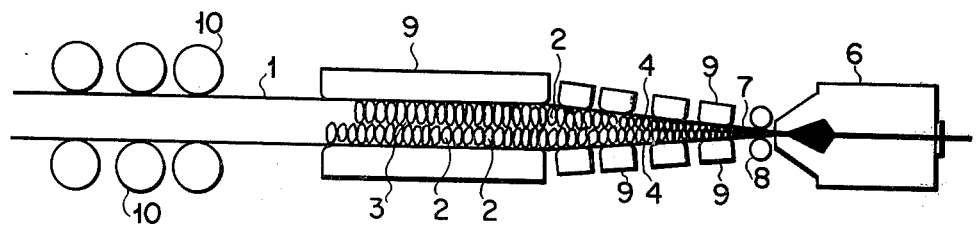
FIG. 3 shows an apparatus to effect the method of the present invention.

The material 7 extruded from the die 6 is cooled rapidly on the upper and lower surfaces thereof by the water-cooled pipe 8, thereby forming solid skin layers 4 thereon, and then subjected to controlled expansion and cooling by the expansion restricting means 9 in which heat medium can be passed. Cells 2 first generate close to the surfaces and then grow gradually toward the center of the material 7. As the expansion is restricted by pressure in accordance with the present invention, cells 2 growing from the upper and lower portions of the material 7 do not unite with each other in the center with the result that a high-density layer 3 is formed there. The foamed board 1 thus produced, finished smooth in a uniform thickness, is taken by the roll 10 of take-up unit. The expansion restricting means 9 can be either formed in one long unit or, as shown in FIG. 3, divided into a few units. The divided expansion restricting means permits expansion control by the individual units of which it is composed. Therefore a set of such means can produce foamed boards of varied densities and thicknesses and control the thickness and cellular structure of the intermediate high-density layer.

According to this invention, foaming in the direction of the thickness of a foamed board is generally restricted mechanically, that is, by limiting said thickness from both upper and lower surfaces of said board preferably in the course of expansion or cell growth. Under this process, the cells which begin to grow from the neighborhood of the upper and lower skins gradually extend inwards to an area lying substantially halfway between the upper and lower sides of the foamed board. In this case, two groups of large cells are not joined together, but are arranged in two rows above and below the aforesaid intermediate high density layer. Mechanical compression to restrict expansion is continuously effected by a plurality of sets of upper and lower metal plates so as to prevent the extruded foamable mixture from being freely expanded. Free foaming after formation of upper and lower skins by cooling does not provide a foamed board having a high density layer formed over an area lying substantially halfway between the upper and lower sides of the foamed board. Said high density layer has a thickness ranging between 0.1 mm and 3 mm, which increases by greater mechanical compression. The high density layer should preferably be spread as much over said intermediate area as possible. To this end, it is necessary to apply substantially uniform cooling to the upper and lower surfaces of the extruded board. The reason why the high density layer is chosen to have a thickness ranging between 0.1 mm and 3 mm is that if said layer has a smaller thickness than 0.1 mm, then the resultant foamed board will decrease in thermal workability and, if the thickness exceeds 3 mm, the resultant foamed board will fail to have a low density. For practical purposes, therefore, the high density layer is preferred to have a thickness ranging between 0.3 and 2 mm.

With reference to FIG. 3, the controlled restriction to expansion of the extruded sheet or board, after creation of the skin layers 4 thereon, occurs in two phases. In the first phase, the restriction means 9 diverges from a thickness approximating the board thickness during creation of the skin layers to a thickness approximating the final desired thickness for the finished board. In the second phase, the restriction means 9 are parallel thereby maintaining the board at its final desired thickness during this portion of the slowing cooling of the board. The ratio of the thickness of the input end of the divergent portion of the restriction means 9 to the thickness of the output end thereof advantageously is between about 1:3 and 1:15, especially between about 1:4 and 1:7. The ratio of length of the divergent portion of restriction means, measured from input end to output end, to the thickness of the output end advantageously is between about 100:1 and 10:1, especially between about 75:1 and 15:1. The ratio of length of the divergent portion to the length of the parallel portion of restriction means 9 advantageously is between about 3:1 and 1:3 and especially between about 1:1 and 1:2.5.

Where the expansion of the foamed board in the direction of its thickness is restricted as above described, then cells elongated in the direction of the thickness of said board will have an average diameter 1.5 to 5 times that of cells extending in the direction of the width of said board. Conversely where the board, if made thick, is freely foamed with the result of no formation of an intermediate high density layer, then the cells extending in the direction of the thickness of the board will have an average diameter longer than 5 times that of cells extending in the direction of the width of the board, causing the resultant foamed board to have a smaller compressive strength and thermal workability.

According to another embodiment of the present invention, there is provided a tough board of thermoplastic resin foam which has a cellular structure wherein the diameter of cells is larger in the lengthwise direction of the board than in the crosswise direction.

Such a foamed board has a relatively larger bending strength in the lengthwise direction thereof.

The following is a process for the manufacture of the above-mentioned foamed board.

The process includes the step of expanding the extruded board with the solid skin layers thereon while the expanding board is subjected to a slight tension, which is usually applied to the expanding board between at least two sets of the above-mentioned expansion restricting means placed into contact with the expanding board, in a lengthwise direction by properly controlling the take up speed and/or the contact pressure of the expansion restricting means, before said board is cooled, thereby enabling cells to have a longer diameter in the lengthwise direction of the board than that in the crosswise direction thereof. Where the lengthwise cell diameter has a diameter 1.1 to 1.5 times the crosswise diameter, then the resultant foamed board will have not only prominent compressive strength, but also lengthwise bending strength. Therefore, this improvement offers advantage where a foamed board is used in a considerably long length relative to a width.

There will now be described in detail a method of manufacturing a tough foamed board of the invention.

A method of manufacturing a tough foamed board according to this invention comprises extruding a mixture of a thermoplastic resin and a volatile foaming agent in the form of a board through a die orifice at a temperature slightly higher than the softening point of the mixture; cooling the upper and lower surfaces of the board rapidly to form skin layers thereon; and cooling the board provided with the skin layers so slowly as to cause foam nuclei to be formed therein and also cells to be grown with an average diameter larger than 5 mm, while applying pressure on the upper and lower surfaces of the board to restrict an expansion in the direction of the thickness thereof to 0.5 to 0.95 times that thickness which would be realized by the extruded board, if foamed freely under atmospheric pressure. Formation of skins on the upper and lower surfaces of the extruded board prevents it from being expanded in the extruding direction as well as in its crosswise direction, enabling foam nuclei to be grown substantially in the direction of the thickness of the extruded board, and consequently providing a thick foamed board formed of rugby ball-like cells. The controlled restriction of the expansion of the extruded board in the direction of its thickness brings about the formation of a high solid density layer lying substantially halfway between the upper and lower surfaces of the board. In the process according to the present invention, there can be attained the formation of skins thicker than 0.5 mm, preferably 1 to 3 mm thick and an intermediate high density layer thicker than 0.1 mm. A foam bearing such skins and the intermediate high density layer noticeably increases in not only compressive strength but also bending strength. Rapid cooling of the upper and lower surfaces of the extruded board may be effected by blowing cold gas, for example, cold air into the board, spraying liquid such as water thereon, placing it into contact with cooled metal material such as a metal roll or plate, or fixing it to a sheet-like material such as metal plate, gypsum board and woven glass fabric.

A foamed board manufactured by the method of this invention contains large cells. Though not theoretically clearly defined yet, the mechanism by which a foam having such large cells is produced is thought from the experiments made by the present inventors, to be that when the volatile foaming agent is gasified very slowly under a condition substantially free from a shearing stress, then foam nuclei were created in a relatively small number, thus resulting in the growth of large cells.

The following are conditions producing formation of large cells by slow gasification of the volatile foaming agent:

(1) extrusion of the thermoplastic resin with admixed volatile foaming agent kept in a dissolved state;

(2) extrusion of the resin mixture at as low temperatures as possible; and (3) effecting expansion of the extruded plastic mass continuously for a long time preferably under a condition substantially free from shearing stress.

Production of plastics foam containing cells having a larger diameter than 5 mm can be attained only when the above-mentioned requirements are satisfied. As used herein, the term "foam cells having a larger diameter than 5 mm" means that the whole volume occupied by cells having a larger diameter than 5 mm accounts for more than 50 percent based on the entire volume of a foamed board. When the mixture of the resin and volatile foaming agent in a dissolved state is extruded at relatively low temperature into the atmosphere, said foaming agent becomes supersaturated in the resin. The supersaturated foaming agent gathers in the nonhomogeneous portion of the mixture, for example, the portion where there is a nucleating agent, thus giving rise to the creation of foam nuclei.

Foam cells tend to grow by the vapour pressure of the foaming agent prevailing at the temperature used. However, said growth is obstructed by the viscoelasticity of the thermoplastic resin. The growing speed of foam cells, therefore, is defined by the degree of supersaturation and vapour pressure of the volatile foaming agent and the viscoelasticity of the thermoplastic resin. This invention enables foam having large cells to be produced by controlling these factors to attain the proper growing speed of cells.

Growth of foam cells is supposed to terminate at a point at which the vapour pressure of the volatile foaming agent and the viscoelasticity of the thermoplastic resin fully balance each other. If cooling is carried out too quickly, the growth of cells will cease before they are fully formed, causing them to be reduced in size, and in consequence failing to provide a foam of low density and appreciable thickness. Conversely, if cooling is effected too slowly, the growth of cells will be carried to excess, giving rise to the occurrence of voids within the foam.

The thermoplastic resins used in the method of this invention include polyolefins, copolymers of olefins, polystyrene, copolymers of styrene, polyvinyl chloride, copolymers of vinyl chloride, acrylic resin, polyamide, polyester, polyacetal and polycarbonate. Preferable among these thermoplastic resins are polyolefins and copolymers of olefins. Particularly desirable are polypropylene and high density polyethylene having a smaller melt index (M.I.) than 0.5. Though the reason is not fully understood, these polypropylene and high density polyethylene facilitate the growth of foam cells with thick walls and strands, thereby enabling a desired foam to be manufactured stably.

The volatile foaming agents used in the method of this invention include hydrocarbons, halogenated hydrocarbons, alcohols, ethers, esters and mixtures thereof each having a boiling point lower than the softening point of the thermoplastic resin used. Preferable are hydrocarbons and halogenated hydrocarbons having a boiling point ranging from $-20°$ C. to $50°$ C. Particularly preferable is trichloromonofluoromethane. This is supposed to be for the reason that said material has a prominent solubility in the thermoplastic resin in the extruder and presents a sharp decrease in solubility when the pressure and temperature fall after extrusion. While an amount of the volatile foaming agent added to the thermoplastic resin varies with its kind, the amount of said foaming agent is generally chosen to be 2 to 20 parts by weight or preferably 6 to 15 parts by weight based on 100 parts by weight of the thermoplastic resin. If too much foaming agent is added, then there will grow a large number of foam nuclei in the die. As the result, when the resin mixture is extruded into the open air, there will appear fine cells in the foam, suppressing any further growth of cells. Further, part of the foaming agent will be lost by escaping through the cell wall, failing to provide large cells and in consequence a thick foam.

Conversely, if the foaming agent is used in too small an amount, then the growth of foam nuclei will decrease, leading to a failure to produce desired cells, and in consequence a thick foam of low density. When a foaming agent suitable for the thermoplastic resin used is added in the above-mentioned proportions, it is required that there be formed no or few visible foam nuclei in the die. If, otherwise, numerous foam nuclei are formed, there will not be obtained a foam having large cells. The extrusion temperature applied in the method of this invention is generally between the softening or melting point of a resin mixture and a temperature $30°$ C. higher than the softening or melting point of the resin itself. If extrusion is carried out at too high temperature, then the foaming agent will present an unduly high vapour pressure, and the viscoelasticity of the thermoplastic resin will be excessively low. When, therefore, the resin mixture is extruded through a die into the open air, the foaming agent will change into numerous fine bubbles which partly escape through the mixture without foaming cells therein, failing to provide a mechanically strong foam having large cells.

Since the foaming agent used in the present invention is soluble in the thermoplastic resin, the softening or melting point of the resin mixture is considerably below that of the resin itself. Therefore, if extrusion is attempted at temperatures lower than the softening or melting point of the resin mixture, then extrusion will substantially fail.

In the method of this invention, slow cooling of the extruded resin mixture is continued long enough to attain a desired growth of cells, generally for a period of 2 to 25 minutes.

Slow cooling is customarily carried out by allowing the extruded mixture to stand in the air, blowing air onto it, or introducing into the extrusion restricting means provided on the expanding extruded mixture a heat transfer medium such as water or another kind of liquid at higher temperature than room temperature.

For the method of this invention, it is important to form and grow a relatively small amount of foam nuclei invisible to the naked eye and it is therefore desirable to use a small amount of a nucleating agent. The nucleating agent may consist of inorganic materials such as calcium carbonate, clay, talc, zinc white, silicate and glass powders carbon black, or organic materials such as wooden powders. The nucleating agent should preferably be used in a smaller amount than 3 parts by weight, or most preferably 0.1 to 1.5 parts by weight based on 100 parts by weight of the thermoplastic resin used. Absence of the nucleating agent will tend to result in the uneven sparse distribution of cells. Conversely, excess addition of the nucleating agent will lead to the excessive formation of foam nuclei and in consequence the occurrence of fine cells, failing to provide a desired mechanically strong foam having large cells.

In the method of this invention, it is desirable to make foam nuclei grow under a condition substantially free from a shearing stress. Accordingly, it is not advised to use a process of producing foam nuclei in the head of an extruder and extruding the resin mixture while expanding it.

Since the method of this invention comprises slowly cooling the extruded mixture for its tardy expansion, it is taken up from a die at a lower speed than an extrusion speed at the extrusion die, thereby effecting expansion under a condition substantially free from a shearing stress. If the extruded resin mixture is drawn from the die faster than it runs through the die and thereafter expanded, then numerous fine cells will tend to be formed in the resin, failing to provide the foam of this invention having excellent physical properties. The reason why the foam of this invention presents great mechanical strength, particularly prominent compressive strength is that it has large cells, therefore, thick walls and strands, and solid skin layers on its both surfaces and an intermediate high density layer.

According to the present invention, there can be obtained a foam generally having a thickness of 5 to 200 mm, or preferably 10 to 80 mm. A foam having a smaller thickness than 5 mm fails to have large cells and consequently a low density. If said thickness exceeds 200 mm, then there will appear large voids in the center of the foam, failing to make it mechanically strong.

The foam prepared by this invention is characterized in that it has great mechanical strength and low density generally ranging between 0.05 to 0.35 g/cm$^3$, preferably between 0.08 and 0.25 g/cm$^3$.

The foam-manufacturing method of this invention permits the resin mixture to incorporate various additives such as antioxidants, ultraviolet absorbers, flame retardants and pigments.

As previously described, the foamed board of this invention is crusted on the upper and lower surfaces and comprises a high density layer lying substantially halfway between the upper and lower surfaces of the board, and long cells extending in the direction of the thickness of said board and arranged in two rows above and below said high density layer, thereby displaying excellent compressive strength and bending strength, and moreover bondability and thermal workability due to the presence of said intermediate high density layer. Where a plurality of foamed boards according to this invention are thermally bonded together at the sides representing the thickness thereof, then said bonding can be effected very firmly due to the presence of the upper and lower skins and intermediate high density layer. Where the foamed board is heat bent, the bent portion hardly becomes thinner due to the presence of said intermediate high density layer. Conversely, a foamed board lacking said intermediate high density layer is liable to become thinner at its bent portion and decreases in heat insulation and mechanical strength. The foamed board of this invention sometimes shrinks after manufacture. However, such shrinkage can be easily eliminated simply by heat treatment.

The foam of this invention has prominent resistance to not only compression and bending but also chemicals and frigidity. Moreover, said foam has decidedly more excellent heat insulating and shock absorbing properties than wood or hard board, though slightly inferior in these respects to a foam bearing fine cells. Accordingly, the foam of this invention can be used in a considerably wide field of application, such as antifreezing materials for railways and roads, scaffold board, civil engineering materials such as concrete-forming plates, structural materials such as the floors, walls and roof, heat insulating members of building, heat insulating materials of refrigerated warehouses, packing materials used in a container in which heavy articles are transported, pallets and noise absorbing materials.

EXAMPLES

This invention will be more fully understood from the examples which follow.

EXAMPLE 1

An extruder 80 mm in diameter was charged with a mixture of 100 parts by weight of high density polyethylene having a melt index (g/10 mm, 190° C., 2.16 kg) of 0.2, a density of 0.96 g/cm$^3$ and melting point of 134° C. and 1 part by weight of calcium carbonate as a nucleating agent. While the mixture was passing through the extruder there was added to the mixture a volatile foaming agent of trichlorofluoromethane in various amounts indicated in Table 1 below. The resin mixture was extruded through a flat die 400 mm wide and 3 mm thick and taken up at various speeds indicated in Table 1.

Table 1

| Item \ Sample No. | 1 | 2 | 3 | 4 | 5 | 6 |
|---|---|---|---|---|---|---|
| Trichlorofluoromethane (parts by weight) | 7.0 | 8.2 | 9.0 | 10.4 | 11.8 | 13.2 |
| Extrusion speed (cm/min. aproximate) | 30 | 30 | 30 | 30 | 30 | 30 |
| Take up speed (cm/min.) | 10.0 | 10.5 | 11.0 | 12.0 | 12.5 | 13.0 |
| Time required for full growth of cells (min.) | 10.5 | 11.0 | 11.5 | 12.0 | 12.5 | 13.0 |
| Thickness of foam (mm) | 36 | 37 | 37 | 40 | 42 | 43 |
| Thickness of intermediate layer (mm) | 0.5 | 0.3 | 0.4 | 0.4 | 0.4 | 0.5 |

Table 1-continued

| Item | Sample No. 1 | 2 | 3 | 4 | 5 | 6 |
|---|---|---|---|---|---|---|
| Thickness of skin (mm) | 0.5 | 0.5 | 0.8 | 0.8 | 1.0 | 1.0 |
| Density of foam (g/cm$^3$) | 0.24 | 0.20 | 0.15 | 0.13 | 0.10 | 0.08 |
| Percentage volume occupied by cells more than 5 mm in diameter (%) | 80 | 82 | 80 | 90 | 90 | 95 |
| Shape of cells (a/b)* | 3.0 | 3.0 | 3.2 | 3.2 | 3.5 | 3.5 |
| Compressive modulus (kg/cm$^2$) | 330 | 215 | 135 | 199 | 70 | 58 |
| Flexural modulus (kg/cm$^2$) | 2990 | 1910 | 1090 | 830 | 520 | 330 |

*a represents the length of a cell in the direction of the thickness of a foamed board and b the length thereof in a direction of the width thereto.

The temperature of the resin mixture was 142° C.

Using an apparatus as shown in FIG. 3, the resin mixture extruded through the flat die 6 was contacted by a copper pipe 8, 20 mm in diameter disposed at the die outlet and cooled to 15° C. so as to have only both surfaces cooled rapidly for the formation of skins 4. Foam nuclei began to be formed in the extruded mixture 7 when the extruded mixture reached 1 cm from the die outlet and cells commenced growth when said extruded mixture further travelled about 3 to 4 cm from the die outlet. The cells grew only in the direction of the thickness of the board obtained. Expansion of the extruded board was restricted by the expansion restricting metal plates 9 to about 80% of that extent which would be realized by said board if foamed freely under atmospheric pressure. The growth of cells terminated when the board moved about 150 cm from die outlet. The board obtained about 400 mm wide, comprised a high density layer 3 lying substantially halfway between the upper and lower surfaces of the board and rugby ball-like cells arranged in two rows, most of which had a larger diameter than 5 mm, and extended in the direction of the thickness of the board.

Measurement was made of the thickness of the board, thickness of intermediate high density layer, skin thickness, density, compressive modulus and flexural modulus of various board samples Nos. 1 to 6 obtained, the shape and size of cells, the results being presented in Table 1 above.

EXAMPLE 2

An extruder 65 mm in diameter was charged with a mixture of 100 parts by weight of crystalline polypropylene having an M.F.I (g/10 mm, 230° C., 2.16 kg) value of 0.3 and a density of 0.90 g/cm$^3$ and one part by weight of calcium carbonate. While the mixture was passing through the extruder, 12 parts by weight of trichlorofluoromethane was added to the mixture. Using an apparatus as shown in FIG. 3, the resin mixture was extruded through a flat die 6, 240 mm wide and 2 mm thick. The temperature of the resin mixture was 170° C. The resin mixture was extruded at a speed of 30 cm/min. and taken up from the die at a speed of 20 cm/min. The extruded mixture delivered from the die was brought into contact with a copper pipes 8, 20 mm in diameter disposed at the die outlet and kept at a temperature of 15° C. to cool rapidly both surfaces of the foam obtained, thereby forming skins 4 thereon. When the extruded mixture reached a point 0.5 cm apart from the die outlet, there were created foam nuclei and when the mixture travelled about 3 cm from the die outlet, cells commenced growth, which continued in the direction of the thickness of the foaming board. By the expansion restricting metal plates 9, expansion of the extruded board in the direction of its thickness was restricted to about 85% of that extent which would be realized by said board if foamed freely under atmospheric pressure. The foaming board was cooled at 30° C. The growth of cells was brought to an end when the foaming board moved about 60 cm from the die outlet. The foamed board obtained was 15 mm thick, 240 mm wide and 0.14 g/cm$^3$ in density with skins 0.5 mm thick. The intermediate high density layer was 0.5 mm thick and cells extending in the direction of the thickness of the foamed board were arranged in two rows above and below said high density layer. The whole volume occupied by cells having a longer diameter than 5 mm accounted for 80 percent of the entire volume of the foamed board. Further, the ratio a/b of cell lengths (a and b as previously defined) was about 2.2. Thus there was obtained a foamed board having prominent physical properties such as compressive modulus of 175 kg/cm$^2$ and flexural modulus of 1400 kg/cm$^2$.

EXAMPLE 3

An 80 mm extruder was initially charged with 100 parts by weight of high density polyethylene having a melt index of 0.2 and a density of 0.96 g/cc and 0.5 parts by weight of calcium carbonate. Thereafter, 10 parts by weight of trichlorofluoromethane was added at the intermediate part of the extruder cylinder to dissolve the initially charged mass. Using an apparatus as shown in FIG. 3, a board was extruded at 140° C. through a die 6, 400 mm wide and 3 mm thick. Immediately after extrusion of the board, water-cooled pipe 8 were pressed against the upper and lower surfaces to form skins 4 about 0.3 mm thick so as to suppress expansion in the crosswise and lengthwise directions. The foamed board finally had a thickness of 40 mm obtained by mechanically restricting (as shown in Example 1) expansion to about 70% expansion ratio in the direction of the thickness of the board 1. Taking up of the board was so conducted as to give a slight tension to the board in the lengthwise direction by slightly adjusting the take up speed. The board 1 had a density of 0.15 g/cc. The average diameter of cells 2 arranged in two rows was 5.1 mm in the lengthwise direction, 4.0 mm in the crosswise direction and 19 mm in the direction of the thickness of the board. A high density layer 3, 0.3 mm thick was formed over an area lying substantially halfway between the upper and lower surfaces of the board.

The board had a compressive modulus of 230 kg/cm$^2$, a flexural modulus of 1200 kg/cm$^2$ in the lengthwise direction and that of 900 kg/cm$^2$ in the crosswise direction, good water proofness, workability and heat insulation.

Figure 1:
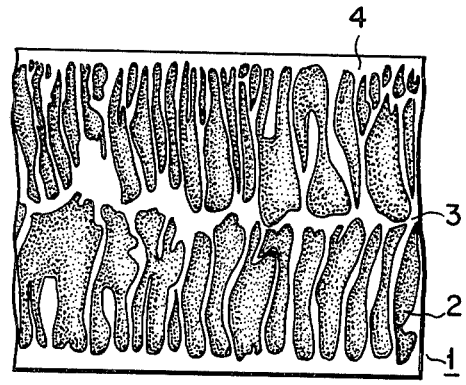
FIG. 1 is a lengthwise sectional view of a tough board of thermoplastic resin foam according to this invention.
Figure 2:
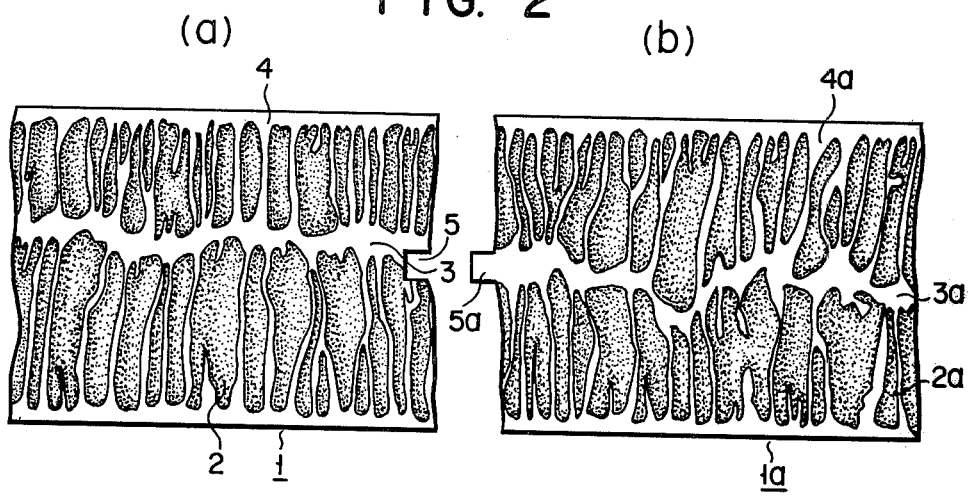
FIGS. 2(a) and 2(b) are lengthwise sectional views of the tough board of this invention provided with engagement portion.

Referring to FIGS. 2(a), 2(b), the foamed boards 1, 1a are provided with a depression 5 and a projection 5a respectively at the facing ends of the high density layers 3, 3a, thereby attaining engagement between said boards 1, 1a. The engagement portions formed of mechanically strong members are tightly joined together without being loosened even during long use. In FIG. 2, referential numerals 2 and 2a denote cells arranged in two rows; and 4 and 4a skins.

Measurement was made of the compressive modulus of a board about 57 mm thick which was freely foamed unlike the foamed board prepared in the above-mentioned examples and formed of a single row of cells. Said compressive modulus indicated 120 kg/cm². This control sample of a foamed board had low waterproofness, workability and heat insulation.

EXAMPLE 4

An extruded material was foamed in substantially the same manner as in Example 3, excepting that the high density polyethylene was replaced by polypropylene having a melt flow index of 0.3 and density of 0.90 g/cc and extrusion was carried out at 180° C. A foamed board obtained had a density of 0.13 g/cc, and comprised a high density layer about 1 mm thick formed over an area lying substantially halfway between the upper and lower surfaces of the board and cells arranged in two rows above and below said high density layer, said cells having an average diameter of 6.0 mm in the lengthwise direction, 5.2 mm in the crosswise direction and 19.0 mm in the direction of the thickness of the board. The product had prominent mechanical strength and heat resistance.

EXAMPLE 5

Two samples of a foamed board prepared in Example 3 with a high density layer formed over an area lying substantially halfway between the upper and lower surfaces of the board were joined together by compressing each other the heated facing sides representing the thickness.

The joined mass was very mechanically strong due to the presence of said intermediate high density layer.

By way of comparison, two samples of a foamed board were joined together in the same manner as described above which were prepared with the same thickness from material having the same density and comprised cells having an approximately equal diameter, but lacked the aforesaid intermediate high density layer. The joined mass had a considerably lower bonded strength than in the preceding case.

EXAMPLE 6

A foamed board obtained in Example 3 was bent substantially at right angles while heating to about 140° C. The bent portion presented a thickness little different from that which was maintained before bending. In contrast, a foamed board similar to the above-mentioned sample, but lacking an intermediate high density layer become noticeably thinner at the bent portion, showing that it had low thermal workability.

The embodiments of the invention in which an exclusive property or privilege is claimed are defined as follows:

1. A method of manufacturing a tough board of thermoplastic resin foam of low density having solid skin layers formed on the upper and lower sides thereof, a solid intermediate high density layer lying substantially halfway between the upper and lower surfaces of the board and generally coextensive with said skin layers and large cells elongated in the direction of the thickness of the board arranged in two rows separated by said intermediate layer which comprises:

(a) introducing into an extruder thermoplastic resin, 2 to 20 parts by weight of a volatile foaming agent based on 100 parts by weight of said resin and soluble in said resin at extrusion temperature and less than 3 parts by weight of a nucleating agent based on 100 parts by weight of said resin;
   (b) causing said foaming agent to become dissolved in said resin;
   (c) extruding a sheet of the resulting mixture from said extruder through a die orifice at a temperature ranging between the softening or melting point of said mixture and a temperature 30° C. higher than the softening or melting point of the thermoplastic resin itself;
   (d) cooling the upper and lower surfaces of said sheet rapidly to form solid skin layers thereon;
   (e) thereafter cooling the sheet slowly over a period of between about 2 to 25 minutes so that foam nuclei formed therein grow slowly into cells during said cooling period causing said sheet to expand transversely, and
   (f) pressing the expanding sheet throughout said cooling operation with expansion restricting means on the upper and lower surfaces thereof to restrict the thickness thereof, said pressing being conducted in first and second phases,
   (g) the pressing in said first phase causing the skin layers of the expanding sheet to diverge from one another as the sheet travels downstream from said extruder,
   (h) the pressing in said second phase causing the skin layers of the board issuing from said first phase to remain parallel while the cooling thereof for said period is substantially completed providing the tough board aforesaid having a thickness between about 50 to 95% of that thickness which would be realized by the extruded board if foamed under atmospheric pressure in the absence of said restrictive pressing.

2. The method of claim 1 wherein said high density layer has a thickness between about 0.1 to 3 mm.

3. The method of claim 1 wherein said high density layer has a thickness between about 0.3 to 2 mm.

4. The method of claim 1 wherein said skin layers are about 1 to 3 mm thick.

5. The method of claim 1 wherein more than 50% of said elongated cells has a longer dimension of at least 5 mm on the average.

6. The method of claim 5 wherein the average dimension of cells in the direction of the thickness of the board bears a ratio of between 1.5:1 and 5:1 to the average dimension of the cells in the lengthwise direction of the board.

7. The method of claim 1 wherein said board has a thickness between about 5 to 200 mm and a density between about 0.05 to 0.35 g/cc.

8. The method of claim 1 wherein said extruded sheet is taken away from said die at a lower speed than the extrusion speed at the die.

9. The method of claim 1 wherein said thermoplastic resin is a polyolefin having a melt index less than 0.5 and said foaming agent is trichloromonofluoromethane.

10. The method of claim 1 wherein the ratio of distance of travel of said expanding sheet in said first restriction phase to the distance of its travel in said second restriction phase is between about 3:1 and 1:3.

* * * * *